US006859718B2

(12) United States Patent
Fritz et al.

(10) Patent No.: US 6,859,718 B2
(45) Date of Patent: Feb. 22, 2005

(54) METHOD AND APPARATUS FOR ACCEPTING DATA

(75) Inventors: Andreas Fritz, Mundelsheim (DE); Bernd Oeffinger, Fellbach (DE); Michael Sorg, Frechen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/394,583

(22) Filed: Mar. 24, 2003

(65) Prior Publication Data

US 2003/0225485 A1 Dec. 4, 2003

(30) Foreign Application Priority Data

Mar. 23, 2002 (DE) ......................................... 102 13 165

(51) Int. Cl.$^7$ ................................................ B60T 7/12
(52) U.S. Cl. ........................... 701/100; 701/29; 701/36
(58) Field of Search .......................... 701/1, 2, 29, 333, 701/36, 100; 709/213, 232

(56) References Cited

U.S. PATENT DOCUMENTS

2002/0019877 A1 * 2/2002 Wrede ........................ 709/230

FOREIGN PATENT DOCUMENTS

| DE | 40 13 727 C2 | 4/1990 |
| DE | 4218804 A1 | 12/1993 |
| DE | 196 20 885 A1 | 5/1996 |
| DE | 196 25 619 C2 | 6/1996 |
| DE | 19620885 A1 | 11/1997 |
| DE | 199 21 845 A1 | 5/1999 |
| DE | 100 01 130 A1 | 1/2000 |
| DE | 100 08 974 A1 | 2/2000 |
| DE | 10037397 A1 | 2/2002 |
| EP | 1128265 A1 | 8/2001 |

* cited by examiner

Primary Examiner—Gertrude A. Jeanglaude
(74) Attorney, Agent, or Firm—Crowell & Môring LLP

(57) ABSTRACT

In a method for entering program data into a control unit in a motor vehicle, the program data are provided by a data transfer point, via the following steps: a program data acceptance request is sent to the control unit, the control unit changes to a program data acceptance state, the program data are transmitted to the control unit, and the program data are accepted by the control unit. Before the control unit changes to the program data acceptance state, the control unit checks whether program data acceptance conditions prescribed for the control unit exist.

14 Claims, 3 Drawing Sheets

| Safety class | | Critical to running safety | | | Not critical to running safety | |
|---|---|---|---|---|---|---|
| | SK0 | SK1 | SK2 | SK3 | SK4 | SK5 |
| | Download not permitted (not flashable) | Download only in a workshop | Download with control by the central control station | Download without control by the central control station | Unit functionality guaranteed | Unit functionality not guaranteed |
| Flash paths | | W1 | W3 | W2 | W2, W3 | W2, W3 |
| Vehicle state | | Z1 | Z3 | Z3 | Z2, Z3, Z4 | Z2, Z3, Z4 |
| Initialization | | I1, I2, I3 | I2, I3 | I2, I3 | I2, I3 | I1, I2, I3 |
| Backup | | B1, B2, B3, B4 | B1, B2, B3 (B4) | B1 | B1, B2, B3 | B4 |

Fig. 2

| Safety class | Requirements |
|---|---|
| SK1 | A1; A2; A5; A15; A16; A17; A18 |
| SK2 | A1; A4; A5; A7; A8; A9; A10; A11; A12; A13; A14; A16; A17; A18 |
| SK3 | A1; A3; A5; A7; A8; A9; A13; A14; A16; A17; A18 |
| SK4 | A1; A3; A4; A6; A8; A9; A10; A11; A12; A14; A16; A17; A18 |
| SK5 | A1; A3; A4; A6; A15; A16; A17; A18 |

Fig. 3

METHOD AND APPARATUS FOR ACCEPTING DATA

BACKGROUND AND SUMMARY OF THE INVENTION

This application claims the priority of German patent document 102 13 165.1, filed Mar. 23, 2002, the disclosure of which is expressly incorporated by reference herein.

The invention relates to a method and apparatus for entering program data (software download) into a control unit in a motor vehicle, where safe running of the vehicle must be ensured.

The acceptance of program data by a control unit is also called "flashing". Flashing in control units affords the particular advantage that faulty control need not necessarily be replaced. By providing control units which can accept new software or data through flashing, the opportunity has been provided to repair faulty control units by means of a software update or to implement new functionalities in a control unit without needing to replace it.

By introducing flash capability for control units, however, problems arise regarding the safety of the program data accepted by the control unit and regarding the safety of the program data acceptance process itself. The first safety problem is how to prevent an unauthorized party from putting a manipulated piece of software into a control unit and thus inflicting a loss on the vehicle user. For the safety of the program data acceptance process, there is the question of what state a control unit needs to be in to accept a flash operation. For example, a control unit cannot permit a flash operation in all circumstances while the vehicle is running, depending on its functionality.

A flash process can produce errors which can have various consequences, depending on the functionality of a control unit. If flashing results in the loss of a particular functionality of a control, in the worst case such loss can affect the safety of the occupants. When flashing software into vehicle control units, using a communication link or a data storage medium it is therefore necessary to ensure that flashing does not result in any risk.

German patent document DE 100 08 974 A1 discloses a method for ensuring the data integrity of software for a control unit in a motor vehicle, in which program data are provided with a signature that is checked for authenticity in the control unit before the data are accepted. The method merely ensures that no data are programmed into the control unit by unauthorized parties. It is concerned with the question of safety of the software itself.

German patent document DE 199 21 845 A1 discloses a method for entering program data into a control unit in a motor vehicle, in which a diagnostic test apparatus asks the control unit what program version the control unit contains and, if appropriate, replaces the program version with a new version. The method ensures that only suitable program data are programmed into the control unit.

The restrictions below are drawbacks of the methods for accepting data in a control unit, based on the prior art:

During flashing, a safe vehicle state is not automatically ensured. The methods are therefore not suitable for flashing program data outside a workshop, particularly while the vehicle is running.

The methods do not guarantee that the operability of the flashed control unit will be maintained.

No explanation is given regarding what operating state a control unit or the vehicle needs to be in for performing the flash operation. There is no allowance for a control unit having to reject a flash process if it is in a state in which execution of the flash process could threaten the safety of the driver or of the vehicle.

There is no automatic differentiation of the control units in terms of their relevance to safety, and the same levels of complexity arise for flashing all control units. Since control units which are not critical to safety are treated with the same level of complexity as control units which are critical to safety, avoidable costs arise.

One object of the invention is to provide a method and apparatus for entering program data into a control unit in a motor vehicle, which avoids the drawbacks of the prior art and, in particular, automatically ensures safe running of the motor vehicle.

This and other objects and advantages are achieved by the method and apparatus according to the invention, in which the control units themselves can check the existence of the conditions required to ensure the functionality thereof when accepting program data. These conditions are referred to hereinafter as program data acceptance conditions. These program data acceptance conditions are prescribed by assigning the various control units into safety classes, based on the operating state of the control unit or of the vehicle in which a flash operation needs to be performed. Assignment of a control unit to one of these safety classes describes precisely the operating states in which a control unit can permit a flash process, and those in which the control unit must reject a flash process.

This arrangement gives the checks which need to be carried out by the control unit before a flash process. If the control unit has been notified that a flash process is required (that is, a program data acceptance request has been sent to the control unit), it must take its safety class as a basis for checking whether it is in a state in which it can or cannot permit a flash process. On the basis of this decision, either the control unit then changes to a program data acceptance state (the "flash" state) in order to be able to perform the flash process, or it responds to the flash request with an error message. When the control unit changes to its program data acceptance state, the program data are transmitted to the control unit from a data transfer point providing the program data, and the control unit accepts the program data.

Before a software download is performed, the control unit checks the existence of the program data acceptance conditions prescribed by the control unit's safety classification. Preferably, the sender of the program data (that is, a data transfer point) also checks the existence of program data acceptance conditions prescribed for the control unit in question. In this case, the program data acceptance conditions which are to be checked by the control unit and by the data transfer point preferably match. It is then preferably possible to establish which program data acceptance conditions need to exist by requesting the control unit's safety classification. By way of example, the control unit's safety classification can be stored in the control unit.

In one preferred embodiment of the inventive method, the control unit requests the result of the check from the program transfer point. This request can also replace at least some of the check to determine whether the program data acceptance conditions existing for the control unit exist. This advantageously results in a potential saving when technically equipping the control unit.

If one or more requirements placed on the program data acceptance conditions corresponding to the safety classification do not match the current situation, then the software download can be rejected by the control unit and/or the software is not provided by the data transfer point. If the prescribed program data acceptance conditions do not exist, the program data to be accepted can be buffer-stored by the data transfer point until the right situation has actively been produced by the control unit and/or has arisen. The software download can then be carried out.

During the software download, the control unit and/or the data transfer point ensure/ensures that the prescribed program data acceptance situations are maintained. By way of example, it is possible to prevent the engine from being started. If there is a communication link between the control unit and a tester and/or a data acceptance control center (central control station) during the software download, the control unit preferably does not exit the program data acceptance state until a data acceptance end command sent by the central control station has been received by the control unit.

To establish the safety classes, allowance is preferably made for the following influencing factors on the program data acceptance conditions:

Data transmission path (flash paths); e.g., flashing over a radio link (air interface);

Vehicle states; e.g., whether the vehicle is currently running,

Type of flash data;

Initialization of a control unit program which is to be accepted (flashware); and Control unit program backup options ("backup options") for the old program data which are to be overwritten and/or complemented with the program data which are to be accepted.

In particular, these are program data acceptance conditions which exist in addition to the requirement of authenticity and integrity of the program data which are to be accepted; that is, they are program-data-independent situations. Authenticity is understood to mean the certainty that the program data come from an authorized source. The integrity of the data means that the data are accepted by the control unit in uncorrupted and/or error-free form. To make sure of the integrity and authenticity, known prior art methods can be used in addition to the method according to the invention. Preferably, an authenticity check on the program data is carried out by the control unit or by the data transfer point. This can be done using the method disclosed in German patent document DE 100 08 974 A1, for example. In this case, the authenticity check on the program data is carried out by checking a signature using a public key. A key pair is used for encrypting and decrypting the program data (comprising a secret key and the public key), and the program data are signed with the secret key. In this context, the public key is preferably stored in the control unit; e.g., within the boot sector.

The inventive method and the apparatuses for carrying out the method avoid the drawbacks of the prior art. In particular, the following advantages are realized:

It is possible to download software into a control unit without putting persons and goods at risk, e.g., using a communication link or a data storage medium;

The invention allows software to be flashed safely even outside a workshop, including while the vehicle is in use; and Complex flashing methods are used only for safety-critical control units, resulting in potential cost savings.

Other objects, advantages and novel features of the present invention will become apparent from the following detailed description of the invention when considered in conjunction with the accompanying drawings.

BRIEF DESCRIPTION OF THE DRAWINGS

FIG. 2 is a table showing the program acceptance conditions that must exist for a control unit to accept program data, on the basis of said program unit's safety class; and FIG. 3 is a table that shows the requirements placed on the control units, based on their safety class.

DETAILED DESCRIPTION OF THE DRAWINGS

Figure 1:
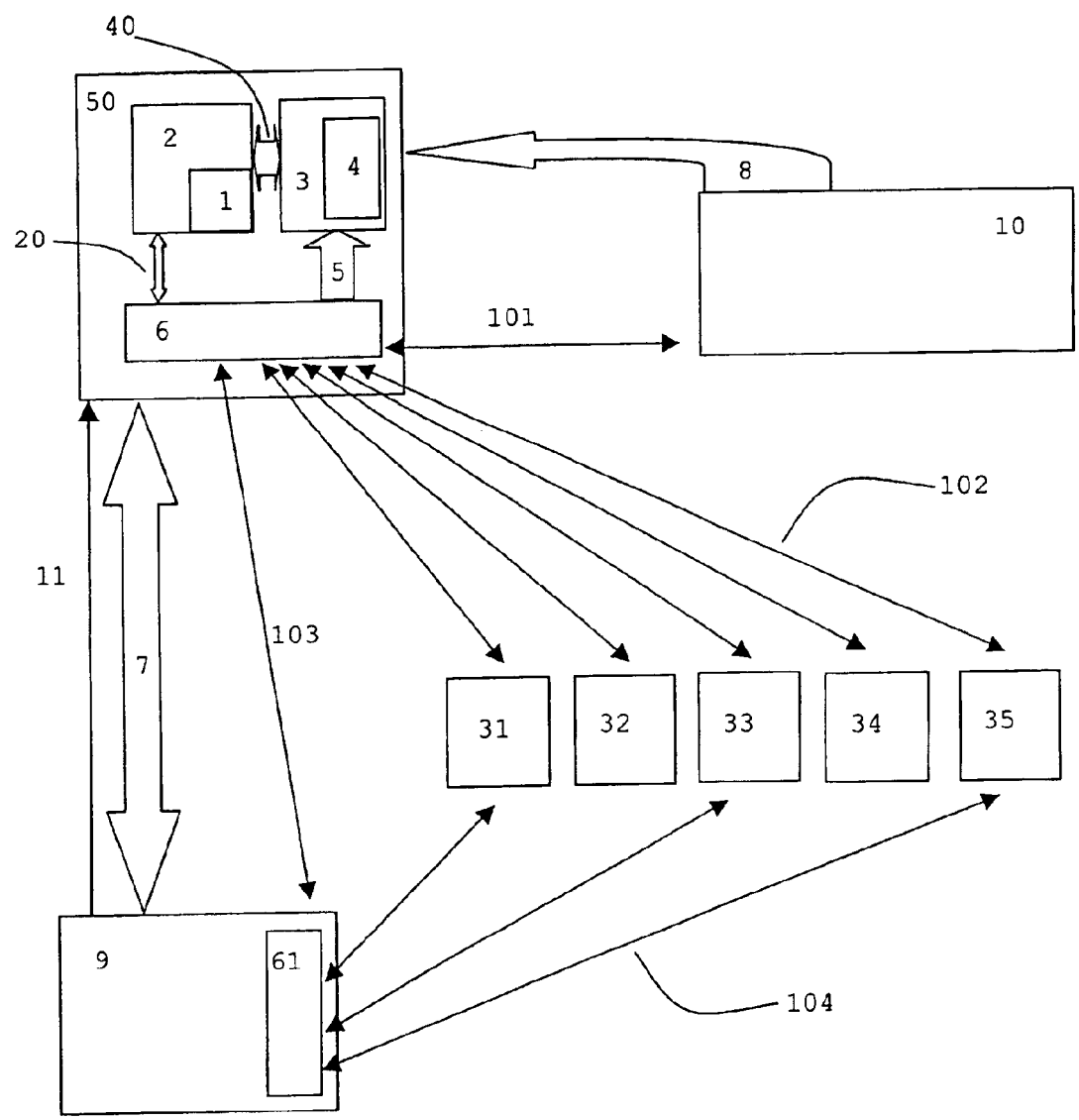
FIG. 1 shows the basic design of a data transfer system according to the invention, and how the components of the system cooperate to carry out the inventive method.

FIG. 1 shows the design of a data transfer system according to the invention, and illustrates the cooperation of the components in the system in order to carry out the inventive method. The illustrated control unit 50 could, for example, be put into safety class 2 or 3 in the table shown in FIG. 2, since the program data acceptance process is monitored and controlled 8 by a program data acceptance control center 10. Acceptance of the program data by the control unit is preferably initiated by the program data transfer point 9 sending a program data acceptance request 11 to the control unit.

The program data transfer point can be located outside the vehicle, in which case communication can then take place, for of example, via a radio link or optical transmission. The program data transfer point can also be in the form of a vehicle component. In that case, communication takes place via a vehicle data bus, for example. The program data to be accepted can be read from an external source (e.g., from a compact disc) by the program data transfer point.

When the program data acceptance request has been received, the control unit starts to check whether the program data acceptance conditions 31–35 prescribed for its safety class exist. To this end, the control unit's assigned safety class 1 can be stored in the control unit's program data memory 2, for example, and can be read 20 in order to establish which program data acceptance conditions need to exist. The safety classes can be assigned to the program data acceptance conditions by linking them via a table, such as the table described in FIG. 2, for example. This has the advantage that software used to control the checks can be used for control units of various types. To check 102 the program data acceptance conditions, the control unit is equipped with means for checking 6 the prescribed program data acceptance conditions. Preferred forms for these means are shown in the table in FIG. 3.

In the embodiment shown in FIG. 1, a check is also carried out to determine whether the program data acceptance conditions "communication link to tester or data acceptance control center" 101 exists. Such a communication link is a prerequisite for the control unit to change to the program acceptance state 5, (e.g., in the case of a safety-critical control unit).

The program data transfer point 9 is also equipped with means 61 for checking prescribed program data acceptance conditions. In the exemplary embodiment shown, the program data transfer point checks 104 the existence of the program data acceptance conditions 31, 33 and 35. Only when the existence of these program data acceptance conditions has been established does the program data transfer point provide the program data for transmission.

The definitions for prescribing which program data acceptance situations need to exist can be established by the program data transfer point (e.g., by requesting the control unit's safety class, stored there). In addition, provision is made for the program data transfer point's program data acceptance situation check results 103 to be requested. When the control unit has established that all the prescribed program data acceptance conditions exist, the control unit changes to the program acceptance state. The means provided in the control unit for accepting the program data 3 can now accept 7 the program data from the program data transfer point. Following acceptance of the program data, an authenticity check 4 on the accepted program data is preferably carried out before said data are forwarded 40 to the program data memory 2.

FIG. 2 is a table showing the program acceptance conditions which need to exist for program data acceptance by a control unit, on the basis of its safety class. The control units are put into safety classes depending on the consequences which control unit malfunction can have on the vehicle's driving safety. First, a distinction is drawn between control units whose functionality is critical to the vehicle's running safety and those control units whose functionality is not critical to running safety. From the point of view of safety, it does not matter whether the consequences of control unit malfunction cannot be controlled or can be controlled only with difficulty. Control units can therefore be divided into two types for the flash process:

Control units in which an error caused by flashing cannot be tolerated in any circumstances because the safety of the occupants or of persons not involved can be affected thereby; and Control units in which an error caused by flashing does not have any "serious" consequences for driving safety and can therefore be tolerated temporarily.

In addition, there are control units which cannot be flashed at all.

This division into three primary classes is refined still further for the two cases "critical to running safety" and "not critical to running safety". For the primary class of control units which are critical to running safety, three different safety classes are defined which are distinguished primarily by the flash path and hence by the option of monitoring the flash operation. The control units which are not critical to running safety can be put into two safety classes. In this case, the user needs to know whether or not the control unit is still operational after the flash process. In total, this results in five safety classes SK1 to SK5 plus safety class zero SK0, which comprises control units which do not permit software downloading.

The text below first gives a detailed description of the program data acceptance conditions which can exist for control units in the various safety classes. The safety classes are then explained with regard to the prescribed acceptance conditions which must be satisfied for a control unit which has been put into the respective safety class.

The new flash data can be sent to the vehicle, and hence to the control unit which is to be flashed, using various interfaces. These data transmission paths are subsequently referred to as flash paths. In this case, the flash paths listed below describe the location in which the vehicle needs to be for the flash process, the person controlling the flash process, and the transmission properties of the channel on which the flash data are sent to the vehicle. The location and the person are linked to one another in this context.

If the flash process is being carried out in a workshop, then the person controlling the flash process is an employee especially trained for the flash process. This employee's qualification means that he knows how to handle the situation which has arisen in an error situation. It can therefore be assumed that, following the flash process performed in the workshop, a fully functional vehicle will be handed over to the vehicle user. If the flash process takes place outside a workshop, it is not possible to assume that the person controlling the flash process knows the correct procedure in an error situation. In this case, it is therefore not possible to assume that the vehicle will continue to be fully functional after an incorrect flash process.

The quality of the flash data's various transmission paths resulting from the flash paths is of no significance for classifying the various paths. A crucial factor for the safety of the flash process on the various paths is not the frequency with which an error occurs but rather the flashing person's opportunities to identify an error, to react thereto and to put the control unit or the vehicle back into a safe and functional state. Thus, when the flash operation is carried out in a workshop, there is the final measure of being able to replace a faulty control unit with a new, functional one. The vehicle user carrying out the flash operation outside a workshop does not have this option. In this case, there is the risk that this person will attempt, despite an error message and an urgent warning, to run the vehicle with the faulty control unit. The text below classifies the three flash paths W1 to W3.

Flash Path One (W1): Flashing Using a Tester

If the flash process is carried out using a tester, it is essential for the vehicle to be in a workshop, since this is the only place where there is access to a tester. In this way, the flash process is carried out by trained technical personnel, or there is a short-term option of access to trained technical personnel, so that any errors arising can be identified and eliminated in the course of the flash operation. As a final measure, the faulty control unit can also be replaced in the workshop in an error situation, so as thus to be able to guarantee safe operability of the control unit and hence of the vehicle. Any risk to the vehicle user following the period in a workshop can therefore be precluded with a high degree of likelihood.

Flash Path Two (W2): Autarkic Flashing Using a CD in the Vehicle

For path two, the vehicle does not need to be in a workshop. Instead, the vehicle user has a CD storing the flash data and the information for the flash operation. The vehicle user puts this CD into a drive in the vehicle. Using path two, the flash process is not performed by trained technical personnel, but rather is initiated by the vehicle owner himself. It is therefore not possible to assume that errors arising during the flash operation can be identified or even corrected. The vehicle user does not have the option of putting the control unit back into a functional state in all circumstances. The vehicle user also does not have the option of correcting the error situation by replacing the control unit. For this flash path, it is therefore not possible to rule out the vehicle user's being put at risk by a control unit which has become unusable as a result of the flash process.

Flash Path Three (W3): Flashing Using the Air Interface

This path can also be used when the vehicle is not in a workshop. The flash data are loaded into the vehicle via the air interface at the initiative of a central control station or of the vehicle user. The data about the flash job are also sent to the vehicle in this manner. The flash operation is carried out on the vehicle not by trained technical personnel but rather by the vehicle user himself. Errors in the vehicle can therefore remain undetected and hence cannot be corrected. In the same way as with flash path two, the vehicle user does not generally have the option of correcting the error in an error situation and hence of putting the control unit into a functional state. At the central control station, the flash operation can be supported and monitored automatically by a central server system or by an employee at the central control station. In both cases, errors during the flash operation can be identified in the central control station by suitable diagnostic tools. The options for correcting the error are very restricted by the transmission medium, however. Thus, replacement of the faulty control unit, which is presented as a final measure in the workshop, cannot be performed directly. The central control station can merely call a service technician to the vehicle, who will then rectify the problem. However, it is not possible to rule out risk for the vehicle user completely, since he may attempt to start the vehicle despite the faulty control unit and a possible warning from the central control station.

During the flash process, a vehicle can be in various states which have different effects on the opportunity to flash. The control units must therefore be able to identify the vehicle state and/or to read it from another control unit. On the basis of this information, the control unit changes to a data acceptance state or rejects data acceptance. The text below classifies the four vehicle states Z1 to Z4.

Vehicle State One (Z1): A Tester is Connected to the Vehicle

In this vehicle state, the vehicle can monitor the software download using appropriate diagnostic tools. Whether or not the vehicle's engine is switched on in this state is not relevant, since the person carrying out the test is a member of trained technical personnel who is sufficiently well informed about dangers and risks. In addition, it can also be necessary at this point for the engine to be running for diagnosis or initialization purposes. Since the person carrying out flashing has all available diagnostic tools on the tester to hand, it can be assumed that errors arising during the flashing will be identified by the technical personnel in the workshop and appropriate countermeasures can be taken. When the vehicle leaves the workshop, the vehicle driver can assume that all flash processes have been performed properly and correctly. This vehicle state is linked to flash path W1.

Vehicle State Two (Z2): The Vehicle's Engine is Running

If the vehicle's engine is on, the vehicle will also normally be in motion. Accordingly, there must be at least one driver in the vehicle, who can monitor the flash process, but is restricted by the necessity of concentrating on the traffic. However, unlike the technical personnel in a workshop, the vehicle driver is not trained for flashing. Furthermore, in vehicle state two, the diagnosis data delivered by the tester are not available. Any errors during flashing can therefore remain undetected or cannot be corrected by the vehicle user. It is therefore not possible to assume successful flashing with certainty. If the control unit currently undergoing the flash process is needed in order to drive the vehicle, failure of the control unit can have unpredictable consequences. Vehicle state two therefore must be classified as particularly critical. In this state, it is also necessary to take into account that the vehicle network is already burdened with the communication required for driving the vehicle, and flashing a control unit produces a further load on the network. Because the data communication required for safely running the vehicle needs to take priority over the data communication caused by the flash process, the control units or the vehicle network need to be able to assign different priorities to the data communication.

Vehicle State Three (Z3): The Vehicle's Engine is Off and the Ignition is On

If the vehicle's engine is off but the vehicle's ignition is switched on, then although a person has turned on the vehicle's ignition, it is not possible to assume that this person is observing the entire progression of the flash operation in the vehicle. Monitoring of the flash process is thus not assured with certainty over the entire period. Unlike the employees of a workshop, the vehicle driver is not specially trained to carry out a flash process. He does not have a tester which he can use to read the diagnosis data for the control unit. Undetected errors can therefore arise during the flash process. If the person performing flashing detects errors, then there is no certainty that he can react to the error correctly. In vehicle state three, it is not possible to assume a successful flash process.

Vehicle State Four (Z4): The Vehicle's Engine is Off and the Ignition is Off

In this vehicle state, when both the engine and the ignition are off, it is not possible to assume that the vehicle user is in the vehicle in order to monitor the download. Instead, particularly in the case of a download using the air interface (W3), it can be assumed that the control unit is being flashed without any input by the vehicle owner. Errors arising during the flash process are therefore very likely to remain undetected. In addition, there is no certainty that errors which the vehicle owner spots can be corrected by him. It is likewise not possible to assume a successful flash process in this state. Since, in order to flash a new piece of flashware with a combination of this state and the flash path air interface (W3), the flash process can be started without having physical access to the vehicle, the flash process needs to be secured by means of additional measures in this combination.

Following transmission of a piece of flashware, it may be necessary to initialize or configure the flashware before it can be used. If this initialization is not carried out correctly for the corresponding control units, the correct manner of operation of the flashed control unit cannot be ensured. The control unit to be flashed needs to be able to establish, before the flash operation, which initialization operation the new flashware requires. This is necessary so that the control unit can decide, on the basis of its safety class, whether or not it can permit a flash process. Only if this decision has been able to be made can the control unit change to the "flash" state. The possible control unit initialization options can be divided into the following three initialization options I1 to I3:

Initialization One (I1): Manual Initialization

This initialization option describes the case in which the control unit needs to be initialized manually following a flash operation. To this end, there needs to be someone with the vehicle who monitors the flash process and can carry out initialization. In this regard, the control unit gives instructions about the manual initialization measures to be taken, and the person carrying out flashing needs to carry out these instructions conscientiously and correctly. If these initialization measures are not taken correctly, then there may be malfunctions in these control units, the consequences of which cannot be judged.

Initialization Two (I2): Automatic Initialization

With this initialization option, a flashed control unit can initialize itself autonomously and automatically after the flash operation. There is therefore no need for any direct monitoring by the person carrying out flashing on the vehicle. Only the error messages possibly generated by the initialization need to be processed. The necessary initialization steps are performed automatically by a control unit directly after a successful flash process. This requires no interaction with the vehicle user.

Initialization Three (I3): No Initialization

This initialization option describes the case in which no further initialization operation is required for the control unit following a flash process. Accordingly, a control unit can be used directly after the flash process without the need for any further step.

The backup option for a control unit's flashware is a further program data acceptance condition which is taken into account for the safety classification. Depending on the existing opportunities for creating a backup, errors during the flash process may or may not be correctable inside the vehicle. In this case, a control unit must be able to decide what opportunity it has to create a backup.

The following control unit program backup options B1 to B4 are taken into account for the safety classification:

Backup One (B1): Backup Possible Internally on the Control Unit

If a control unit has this option, it has a sufficient amount of free memory space to buffer-store the previously stored version of the flashware for backup purposes. In this case, the unit needs to be able to store the available flashware in the free memory and load it in an error situation. When the already loaded flashware is backed up internally, it can be assumed that the old state of the control unit can be restored after an incorrect flash process. If it is necessary to restore the flashware and this results in an error, this indicates an error in the control unit's hardware, and the control unit needs to be replaced.

Backup Two (B2): Backup on an External Control Unit

In this case, the control unit which is to be flashed does not have sufficient memory space in order to store a backup of the currently loaded flashware in its own memory. For this reason, the backup is loaded into another control unit (backup unit) via the internal vehicle network. To this end, the backup unit must be able to buffer-store the flashware of the control unit which is to be flashed via the internal vehicle network and to restore the flashware into the original control unit again on request. The backup unit must be able to erase the files stored in its memory again irrespective of whether or not the backup has been needed.

With this backup option, the restorability of the original state is dependent on the error handling in the internal vehicle network. If appropriate mechanisms ensure that the flashware transmitted via the internal vehicle network can be stored in the second control unit without error and can also be reloaded therefrom into the original control unit without error, this backup level also has the opportunity to restore the old state of the flashed control unit following an error. If error-free transmission via the internal vehicle network is not assured, then it is not possible to assume on this backup level that the old state of the flashed unit can be restored.

In addition, the restorability of the original state of the flashed control unit is dependent on the reliability of the external control unit on which the backup is stored. If an unidentified error arises on account of damage to the external control unit, then it is likewise no longer possible to restore the original state. To be able to restore the backup into the control unit again, the backup needs to be protected with safety mechanisms. For such safety mechanisms, an asymmetric encryption method can be used, for example. If loading the backup without safety mechanisms were permitted, this would open a back door for hackers if no other measures are taken to protect the backup.

Backup Three (B3): Buffering the Flash Data on an External Control Unit

This does not involve a backup in the actual sense, but rather preprocessing of the flashware in a control unit which has sufficient memory space to buffer-store the flashware. The control unit buffer-storing the flashware must be able to test the flashware for authenticity and integrity after flashing. Only if these tests have progressed positively is the buffer-storing control unit able to forward the flashware to the target control unit. This control unit directly overwrites the memory space containing the old flashware with the new flashware. If one of these tests fails despite the previous check in the buffer-storing control unit, the original state of the control unit cannot be restored. For this reason, the transmission channel between the two control units needs to be protected as well as possible in order for this mechanism to guarantee error-free loading of the flashware.

If it is not possible to guarantee the safety of the transmission channel, then buffer-storing the flashware on a second control unit would be invalidated. In this case too, the reliability of the buffer-storing control unit is crucial to the functionality of this backup approach. If this control unit is not able to store the flashware without error, and if an error goes unnoticed, then error-free loading of the flashware is not ensured in this case either.

Backup Four (B4): Backup Not Possible

The last backup class describes the case in which the memory in the unit to be flashed is too small to be able to create a backup of the flashware currently loaded. In addition, there is no way of creating a backup on another unit (B2) or of using another unit as buffer store (B3). If there is no way of creating a backup of the currently loaded flashware, the original state of the control unit cannot be restored in the event of a faulty flash process. In this case, the control unit is no longer of any use on account of the flash process.

The safety classes SK0 to SK5 described below are upward-compatible, i.e., if a control unit is put into a lower safety class (higher number—>less safety requirement), the possible flash processes in the higher safety classes can also be permitted. A control unit in safety class SK5 can therefore be flashed using the five different flash processes described by the safety class. The type of flash data is not taken into account for putting the control units into the safety classes in this exemplary embodiment, first because the flash data have no influence on running safety. Both part of the operating system and an application or parameters can affect the vehicle's running safety in an error situation. Second, in this exemplary embodiment, control units are considered as a whole without distinction on the basis of their individual functionalities. If individual functionalities of the control unit were to be considered, then a control unit might need to be put into various safety classes. This unit would then need to decide on the basis of the functionality altered by the flash operation whether or not it will permit the flash operation in the current state.

The six safety classes SK0 to SK5 listed below are preferably provided for the individual control units:

Safety Class Zero (SK0)

This class is assigned control units which cannot be flashed on account of their technical circumstances or other requirements. Such control units are not suitable for use of the inventive method.

Safety Class One (SK1)

This class is assigned control units which are highly critical to running safety. Flashing is permitted for these control units only in a workshop. Following flashing and before the vehicle is actually running, extensive tests and diagnoses are carried out by trained personnel in order to keep the likelihood of error as low as possible. If errors are discovered during these tests, the technical personnel can react as appropriate and can correct the error. Correct performance of manual initialization in the workshop is ensured, which means that this type of initialization is permitted only in this safety class.

Control units assigned to this safety class can change to the "flash" state only when a tester in the workshop is connected to the vehicle. Whether or not the engine is running in this state is of subsidiary importance in this case. A backup is possible but is not required, because organizational measures ensure that a vehicle is not started up without the corresponding unit having been thoroughly tested. In addition, the workshop is able to load an old, operational version of the flashware into the control unit in an emergency or to replace the control unit completely with a new one in the event of a greater error. The "flash" state can be exited by the control units only if they have been notified of this by means of the corresponding command from the tester.

Safety Class Two (SK2)

This class is assigned control units which are critical to running safety. In this safety class, the flash operation is carried out via the air interface and is monitored by a central control station. A flash process is also permitted outside a workshop. In this case, however, the vehicle must not be moving. This is achieved by requiring that the engine must not be on. By monitoring the flash operation via the air interface, a minimized likelihood of errors can also be assumed in this safety class. If an error is discovered, then the central control station's opportunities for intervention are limited on account of the distance from the flashed vehicle, however. For this reason, this class demands either that a backup be created which is automatically reloaded in the event of failure of the connection via the air interface, or it is possible to dispense with creating a backup if the control unit's "flash" state prevents the engine from starting. While the central control station does not end the control unit's "flash" state in that case, it must no longer be possible to start up the vehicle.

As can be seen from the last section, control units in this safety class can be flashed only using an online connection via the air interface. A crucial factor in this safety class is the opportunity for the central control station to monitor the flash operation via the air interface. The control units exit the "flash" state when they are given the command to do so via the air interface. If the connection via the air interface is interrupted, then attempts are made to reload the backup in order subsequently to be able to exit the "flash" state. If there is no backup or the backup cannot be loaded, the control unit remains in the state until it receives correct flashware via the air interface or via a tester connected in order to correct errors.

The only type of initialization permitted for the flashed control unit in this safety class is the automatic one or none at all, since an error during manual initialization can threaten the functionality of the control unit. This must not be permitted, since this safety class contains control units which are important to the vehicle's running safety. Omitting to create a backup before the flash operation can be permitted only if the control unit is able to prevent the engine from starting before the control unit has been enabled again by the central control station.

Safety Class Three (SK3)

This class is assigned control units which are critical to running safety. In this safety class, the control units are flashed by the vehicle user without monitoring by a central control station. A flash process is also permitted outside a workshop. The vehicle must not be moving. This requirement is satisfied in that the engine cannot be on during a flash operation in this safety class. In this safety class, the vehicle user carries out the flash operation autonomously using a CD which has been put into a drive in the vehicle. There is no way of accessing trained personnel in this class. Since the test and diagnosis options are limited after such a flash operation and cannot be ensured by organizational measures, a backup needs to be provided so that, in an error situation, the unit can be put back into the state before flashing. In this case, only an internal backup is permissible in this context.

As in SK2, only the initialization classes automatic initialization (I2) and no initialization (I3) are permitted in this safety class. An error during manual initialization can result in the correct functionality of the control unit being threatened, which is unacceptable in this safety class. The "flash" state is exited by the control units in this safety class either following successful performance of the flash operation or following successful restoration of the original state as a result of reloading the backup. The assignment of units to safety class SK3 does not preclude flashing in the workshop, however.

Safety Class Four (SK4)

This class is assigned control units which are not sensitive with regard to running safety. However, these control units are subject to the requirement that a flash operation must not be able to cause control unit failure. For these control units, downloading outside a workshop is permitted both in the two rest states (Z3, Z4) and in driving mode (Z2). To guarantee unit functionality after a flash process, it is necessary to provide an internal backup (B1), an external backup (B2) or buffer-storage of the flash data (B3) so that, in an error situation, the control unit can be put into the state before flashing or, in the case of B3, remains in this state. A prerequisite in this context is that the connection between the flashed control unit and the external backup unit operates without error. A restriction solely to the internal backup (B1), as in SK3, is not necessary at this point, since the control unit's functionality is not sensitive with regard to running safety. The requirement for the control unit's functionality to be guaranteed does not have the same standing for the occupants' safety as in the case of a control unit which is crucial to running safety. At this point, backup options B2 and B3 could also be permitted.

Manual initialization of the flashed control unit cannot be permitted in this safety class, since it is not possible to ensure that initialization is performed correctly. Errors during the initialization operation can result in operating errors in the control unit, which would conflict with this safety class's requirement for the control unit's functionality to be guaranteed after the flash operation. The "flash" state is exited by the control units in this safety class either following successful performance of the flash operation or following successful restoration of the original state by reloading the backup. For data transmission outside a workshop, it is possible to use any flash paths which do not require a tester. Monitoring of the flash operation on the air interface can be dispensed with in this safety class. Assigning units to safety class SK4 does not preclude flashing in the workshop, however.

Safety Class Five (SK5)

This class is assigned control units which are not sensitive with regard to running safety and whose functionality does not need to be guaranteed following a flash operation. For these control units, flashing outside a workshop is permitted both in the two rest states (Z3, Z4) and in driving mode (Z2). Since this safety class does not have the requirement that the control unit needs to be put back into an operational state in an error situation following a flash process, it is not necessary to create a backup. This safety class has no specific requirements on the initialization operation, since in this case there are no demands made on the control unit's functionality. Accordingly, manual initialization can be permitted without conflicting with the demands of the safety class. The "flash" state can be exited again by a control unit in this safety class at any time. For data transmission outside a workshop, it is possible to use any flash paths which do not require a tester. Monitoring of the flash operation on the air interface can be dispensed with in this safety class. Assigning units to safety class SK5 does not preclude downloading in the workshop, however.

FIG. 3 shows a table showing requirements placed on the technical implementation of the control units in each safety class. Within the context of these technical implementations of the control units, the forms of the means, provided in an inventive control unit, for checking the prescribed program data acceptance situations are also specified.

The individual safety classes differ in the requirements which they place on the respective control unit in the appropriate class. The table shown lists the requirements from requirements A1 to A20 (identified below) which a control unit has to satisfy if it is to be put into a particular safety class. In this case, only the requirements which are absolutely essential are listed. Thus, by way of example, it is not absolutely necessary for a control unit to be able to create a backup in safety class SK5. Requirement A10 is therefore not shown in the table. If a control unit satisfies this requirement, however, this is no reason for preventing the control unit from being put into safety class SK5. If a control unit is put into one of these safety classes, the control unit needs to satisfy at least the requirements made in the table. If a control unit is not able to satisfy these requirements, it must be put into another safety class having lesser requirements.

The requirements demanded in the table for control units put into the safety classes described, on the basis of said control units' safety class, are as follows:

Requirement One (A1): "Flash" State

Each of the inventive control units needs to have a "flash" running state which it adopts only if the boundary conditions prescribed by the safety class are satisfied. The "flash" state is likewise exited only if the conditions prescribed by the safety class are satisfied.

Requirement Two (A2): Tester Connected

The control unit must be able to establish distinctly whether or not a tester is connected to the internal vehicle network. During transmission via the internal network, this information needs to be protected such that it is not possible to corrupt this information from the outside. If this were not the case, a control unit to which the tester is not directly connected could be notified of a connected tester without a tester actually being connected.

Requirement Three (A3): Autarkic Flashing from a CD

The control unit must be able to read flashware from a CD and to write it to its flash memory correctly. In this case, it must not matter whether the CD has been put into a CD drive belonging to the control unit itself or into the CD drive on an external control unit. In both cases, the flashed control unit must be able to carry out a flash process autonomously without the connection to the tester.

Requirement Four (A4): Flashing Via the Air Interface

The control unit must be able to write the flashware loaded into the vehicle via the air interface into its flash memory correctly. Whether the connection to the air interface is implemented in the unit itself or in an external unit must not make any difference in this case. The control unit must be able to carry out the flash operation autonomously independently of any connection to the tester.

Requirement Five (A5): Engine Off

The control unit must be able to use the internal vehicle network or its own operation to establish whether or not the vehicle's engine is running. When this information is transmitted via the internal vehicle network, this communication needs to be protected against external manipulation such that no deliberate misinformation can be accepted by the unit in this case. This is particularly important in safety classes SK2 and SK3, since the engine must not be running in any circumstances in these classes, because this could threaten the occupants' safety. Transmission via the internal vehicle network needs to be backed-up sufficiently at this point because otherwise the object of the safety class concept would be defeated.

Requirement six (A6): Ignition Off

The control unit must be able to use the internal vehicle network or its own operation to establish whether or not the vehicle's ignition is on. If this information is transmitted via the internal vehicle network, then this transmission needs to be protected against external manipulation, since otherwise the arrangements made in the safety class concept could be thwarted.

Requirement Seven (A7): Prevent Engine On

The control unit must be able to prevent the engine from starting while the control unit is being flashed and/or before a safe running state has been reached. This is of particular importance for control units whose functionality is critical to the vehicle's running safety.

Requirement Eight (A8): Flash Data

Before flashing, the control unit must be able to determine which data are being overwritten in the internal flash memory and which areas of the flash memory are being used for the first time. This is necessary so that the control unit can determine the information required for creating a backup.

Requirement Nine (A9): Internal Backup

The control unit must be able to create an internal backup. To this end, it must first be able to determine whether there is still sufficient space available in its own flash memory for the internal backup. For this, the control unit needs the information obtained from requirement A8. Only with the information about which data need to have a backup created and how much new memory is used by flashing is the control unit able to decide about creating an internal backup. In addition to the decision about the option of creating an internal backup, the unit must be able to create an internal backup and to restore it again in an error situation.

Requirement Ten (A10): External Backup

The control unit must be able to create a backup on an external unit. To this end, it needs to use the information obtained by requirement A8 to determine the data for which a backup needs to be created. In addition, an external control unit having sufficient resources needs to be available which can create the backup in its memory. With this form of backup, the safety and error tolerance of the internal vehicle network is also important. Only safe and error-free transmission can guarantee that the backup can be restored again in an error situation. In this case, the control unit has to rely on the operability of the external control unit and can make only a limited contribution to the success of the backup using its own measures.

Requirement Eleven (A11): Buffering the Data on an External Control Unit (Target Unit)

The control unit must be able to establish whether the data have been buffer-stored on another control unit. In addition, it must be able to establish whether this control unit has carried out the necessary checks regarding integrity and/or authenticity of the program data. Only then can the control unit permit downloading of the flash data. In this case, the safety of the internal vehicle network plays a crucial part in this context too. If the control unit is not able to rely on the authenticity of the buffer-storing control unit, it cannot permit downloading in one of the safety classes (SK2 or SK4) which prescribe a backup.

Requirement Twelve (A12): Buffering the Data on an External Control Unit (Intermediate Unit)

The control unit used for buffering the flash data for downloading needs to perform prescribed checks for authenticity and/or integrity on the flashware before the flash data are forwarded. This means, in particular, that the same checks for authenticity and/or integrity apply to the buffer-storing control unit as to the target unit. In addition, the intermediate unit also needs to know secret information, such as cryptographic keys, for the target unit. If this were not the case, the intermediate unit could not perform a signature check, for example. This requirement can be dispensed with if loading of the software into the buffer store is necessarily preceded by cryptographic authentication of a central control station on the buffer-storing control unit. In this case, the preceding authentication allows a trustworthy source to be assumed. However, a test for technical transmission errors should nevertheless be provided on the buffer-storing control unit so that such an error cannot result in an incorrect flash process which puts the flashed control unit into an undefined state.

Requirement Thirteen (A13): Automatic Reloading of a Backup

The control unit must be able to reload a previously created backup automatically in an error situation. The previously loaded data must likewise be erased again automatically.

Requirement Fourteen (A14): Erasing a Backup

The control unit on which a backup is created, whether it be internal, external or in the form of a buffer store, must be able to erase the loaded backup again. For this, the flashed control unit needs to be informed of a successfully performed flash operation. If a flash operation has been unsuccessful, the backup cannot be erased until after successful reloading into the flashed control unit.

Requirement Fifteen (A15): Identification of the Initialization Method

Before a flash operation is performed, a control unit must be able to determine what initialization method the loaded flashware requires after loading. The control unit can use this information to decide whether or not it can permit the flash operation.

Requirement Sixteen (A16): Manual Initialization

If a control unit requires manual initialization after a flash operation, the steps required for initialization need to be shown in sufficient detail to the person carrying out the flash operation on a display component in the vehicle. In this case, progression from one initialization step to the next can be effected either by the control unit automatically or by means of manual acknowledgement by the user. The communication between the display component and the flashed control unit in this case needs to be protected such that in this case no incorrect information can be transmitted, because if incorrect information can be transmitted, the success of manual initialization is also at risk. The "flash" state cannot be exited by this control unit until manual initialization has been carried out in full. Accordingly, the initialization operation needs to be integrated into the flash process.

Requirement Seventeen (A17): Automatic Initialization

A control unit affording automatic initialization needs to perform this without a further intermediate step directly after the actual flash operation has ended. In this case, this initialization needs to be able to be ended in all circumstances. Thus, by way of example, turning off the ignition must not have any effect on the continuation of the initialization operation. The "flash" state cannot be exited by this control unit until automatic initialization has been carried out in full. Accordingly, the initialization operation needs to be integrated into the flash process.

Requirement Eighteen (A18): Displaying Error Messages

If errors arise during the flash process, the resultant error messages need to be displayed on a display component in the vehicle until they have been acknowledged on the display component by the vehicle user. In this case, a temporary power failure or other state changes in the control unit must not affect display of the error message. The communication between the display component and the flashed control unit needs to be protected such that no incorrect information can be transmitted in this case. At this point, incorrect information transmission can prevent the person who is carrying out the flash operation from being informed about the error which has arisen. The "flash" state cannot be exited by the control unit until the vehicle user has acknowledged the error message by means of appropriate manual action. Accordingly, display of the error message on the display component needs to be integrated into the flash process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for entering program data into a control unit in a motor vehicle from a data transfer point, said method comprising:

sending a program data acceptance request to the control unit;

transmitting the program data to the control unit;

the control unit checking whether program-data-independent program data acceptance conditions prescribed for the control unit are satisfied; and the control unit changing to a program data acceptance state in which the program data are accepted by the control unit after the control unit has determined that the program data acceptance conditions are satisfied.

2. The method according to claim 1, wherein the data transfer point checks whether program data acceptance conditions prescribed for the control unit are satisfied before the program data are provided.

3. The method according to claim 1, wherein the control unit's check to determine whether the program data acceptance conditions prescribed for the control unit are satisfied comprises a request for the data transfer point's check result.

4. The method according to claim 1, wherein at least one of the control unit and the data transfer point establishes which program data acceptance conditions need to exist for the control unit, by requesting a safety classification from the control unit.

5. The method according to claim 1, wherein the program data acceptance conditions are dependent on at least one of a vehicle state, a data transmission path, control unit program initialization options, control unit program backup options and a type of data which are to be accepted.

6. The method according to claim 1, wherein a program data acceptance condition checked by at least one of the control unit and the data transfer point includes at least one of whether the motor vehicle's engine is running and whether there is a communication link between the control unit and at least one of a tester and a data acceptance control center.

7. The method according to claim 6 wherein at least one of the following is true:

while the control unit is in the data acceptance state, the motor vehicle's engine is prevented from starting, by the control unit or by the data transfer point; and the data acceptance state is exited by the control unit only after receipt of a data acceptance end command from the tester or from the data acceptance control center.

8. The method according to claim 1, wherein the data transfer point buffer-stores the program data until the prescribed program data acceptance conditions exist in the control unit for which the program data are intended.

9. The method according to claim 1, wherein:

the data transfer point is in the form of a vehicle component; and the data transfer point accepts the program data from an external source.

10. The method according to claim 1, wherein an authenticity check on the program data is carried out by one of the control unit and the data transfer point.

11. The method according to claim 10, wherein:

the authenticity check on the program data is carried out by checking a signature using a public key;

a key pair is used for encrypting and decrypting the program data, comprising a secret key and the public key; and the program data having been signed with the secret key.

12. A data transfer system for transmitting program data to a control unit in a motor vehicle, comprising:

a data transfer point;

a control unit having means for accepting program data from the data transfer point; and means for checking whether prescribed program data acceptance conditions are satisfied in the control unit and in the data transfer point;

wherein the means for checking prescribed program data acceptance conditions in the control unit are adapted to request check results for a check on prescribed program data acceptance conditions in the data transfer point.

13. A method for entering program data into a control unit in a motor vehicle from a data transfer point, said method comprising:

determining, by the control unit, whether program data acceptance conditions prescribed for the control unit are satisfied; and changing, by the control unit, to a program data acceptance state in which the program data are accepted by the control unit after the control unit has determined that the program data acceptance conditions are satisfied, wherein the program data acceptance conditions are prescribed to the control unit based on one of a plurality of safety classes.

14. The method according to claim 13, wherein the safety class prescribed to the control unit depends upon consequences which a malfunction of the control unit can have on the vehicle's driving safety.

* * * * *